(12) United States Patent
Skiles

(10) Patent No.: US 10,163,308 B2
(45) Date of Patent: *Dec. 25, 2018

(54) CHECKOUT STATION

(71) Applicant: Walmart Apollo, LLC, Bentonville, AR (US)

(72) Inventor: Chris Skiles, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/636,669

(22) Filed: Mar. 3, 2015

(65) Prior Publication Data

US 2015/0179026 A1 Jun. 25, 2015

Related U.S. Application Data

(63) Continuation of application No. 13/799,276, filed on Mar. 13, 2013, now Pat. No. 9,002,733.

(60) Provisional application No. 61/737,603, filed on Dec. 14, 2012.

(51) Int. Cl.
| | |
|---|---|
| *G01G 21/28* | (2006.01) |
| *G07G 1/00* | (2006.01) |
| *G06Q 20/20* | (2012.01) |
| *G01G 19/414* | (2006.01) |

(52) U.S. Cl.
CPC ....... *G07G 1/0072* (2013.01); *G01G 19/4144* (2013.01); *G01G 21/28* (2013.01); *G06Q 20/208* (2013.01)

(58) Field of Classification Search
None
See application file for complete search history.

(56) References Cited

U.S. PATENT DOCUMENTS

| | | | |
|---|---|---|---|
| 3,094,191 A | 6/1963 | Potrafke | |
| 3,164,144 A * | 1/1965 | Adams, Jr. | ........ B28D 1/30 125/13.01 |
| 5,832,417 A * | 11/1998 | Petrucelli | ........ G01G 23/01 177/25.13 |
| 6,241,149 B1 | 6/2001 | Baitz | |
| 7,621,446 B2 | 11/2009 | Addison | |
| 9,002,733 B2 * | 4/2015 | Skiles | ........ G01G 19/4144 705/16 |
| 9,275,526 B2 | 3/2016 | Skiles | |

(Continued)

FOREIGN PATENT DOCUMENTS

| | | |
|---|---|---|
| DE | 102006050727 | 5/2008 |
| GB | 2498851 | 7/2013 |

(Continued)

OTHER PUBLICATIONS

IPO; App. No. GB1222785.6; Search Report dated Feb. 3, 2014; 3 pages.

(Continued)

*Primary Examiner* — Paul Danneman
(74) *Attorney, Agent, or Firm* — Fitch, Even, Tabin & Flannery LLP

(57) ABSTRACT

In some embodiments, a checkout station includes a scale fixedly attached to a framework of the checkout station and a track, surrounding the scale, through which a display moves between a first position and as second position.

27 Claims, 6 Drawing Sheets

(56) References Cited

U.S. PATENT DOCUMENTS

| | | |
|---|---|---|
| 2003/0115103 A1* | 6/2003 | Mason .................... G06F 8/60 705/16 |
| 2007/0138269 A1 | 6/2007 | Baitz |
| 2007/0235531 A1 | 10/2007 | Addison |
| 2009/0198582 A1 | 8/2009 | Tokorotani |
| 2011/0225055 A1 | 9/2011 | Takahashi |
| 2011/0225056 A1 | 9/2011 | Akiyama |
| 2013/0153656 A1 | 6/2013 | Skiles |
| 2014/0172607 A1 | 6/2014 | Skiles |
| 2016/0163162 A1 | 6/2016 | Skiles |

FOREIGN PATENT DOCUMENTS

| | | |
|---|---|---|
| JP | 2003275079 | 9/2003 |
| JP | 2013131220 | 7/2013 |

OTHER PUBLICATIONS

IPO; App. No. GB1222785.6; Search Report dated May 23, 2013; 6 pages.

PCT; App. No. PCT/US2013/075036; International Search Report dated Aug. 22, 2014.

PCT; App. No. PCT/US2013/075036; Written Opinion dated Aug. 22, 2014.

USPTO; U.S. Appl. No. 13/331,541; Office Action dated Jun. 16, 2015.

USPTO; U.S. Appl. No. 13/331,541; Office Action dated Aug. 13, 2013.

USPTO; U.S. Appl. No. 13/331,541; Office Action dated Dec. 3, 2013.

USPTO; U.S. Appl. No. 13/799,276; Notice of Allowance dated Dec. 3, 2014.

USPTO; U.S. Appl. No. 13/799,276; Office Action dated Aug. 6, 2014.

USPTO; U.S. Appl. No. 13/331,541; Office Action dated Nov. 19, 2014.

IPO; App. No. GB1222785.6; Examination Report under Section 18(3) dated Feb. 29, 2016; 3 pages.

USPTO; U.S. Appl. No. 13/331,541; Notice of Allowance dated Oct. 21, 2015.

USPTO; U.S. Appl. No. 15/011,660, Notice of Allowance dated Aug. 11, 2016.

* cited by examiner

CHECKOUT STATION

RELATED APPLICATION(S)

This application is a continuation of U.S. application Ser. No. 13/799,276, filed Mar. 13, 2013 and entitled CHECKOUT STATION, which claims the benefit of U.S. Provisional Application No. 61/737,603, filed Dec. 14, 2012 and entitled CHECKOUT STATION, all of which are incorporated by reference in their entirety herein.

This application is related to co-pending and co-owned U.S. application Ser. No. 13/331,541, filed Dec. 20, 2011 and entitled CHECKOUT STATION, which is incorporated by reference in its entirety herein.

FIELD OF THE INVENTION

The present invention is generally directed to an apparatus and method for retail checkout stations. In particular, the present invention is directed to a checkout counter that can be conveniently converted between a cashier mode and a self-checkout mode.

DETAILED DESCRIPTION OF EXAMPLE EMBODIMENTS

In retail establishments, sales to customers normally take place at checkout stations located on the premise. Currently, sales in stores may occur in the form of cashier-assisted checkouts or self-checkouts that may be carried out in cashier stations or self-checkout stations, respectively. In cashier-assisted checkouts, a customer may place merchandise on a conveyor belt of the POS station. A cashier who stations near a receiving end of the conveyor belt may scan each item using a barcode scanner to check out the merchandise. After the cashier has checked out the merchandise for the customer, the customer may proceed along the checkout station side that is opposite to the cashier side to a pay station to complete the sale transaction. In contrast, in self-checkouts, the customer may scan each item at a checkout station by himself. After all merchandise has been recorded, the customer may proceed to pay for the purchase at the pay station.

Figure 1:
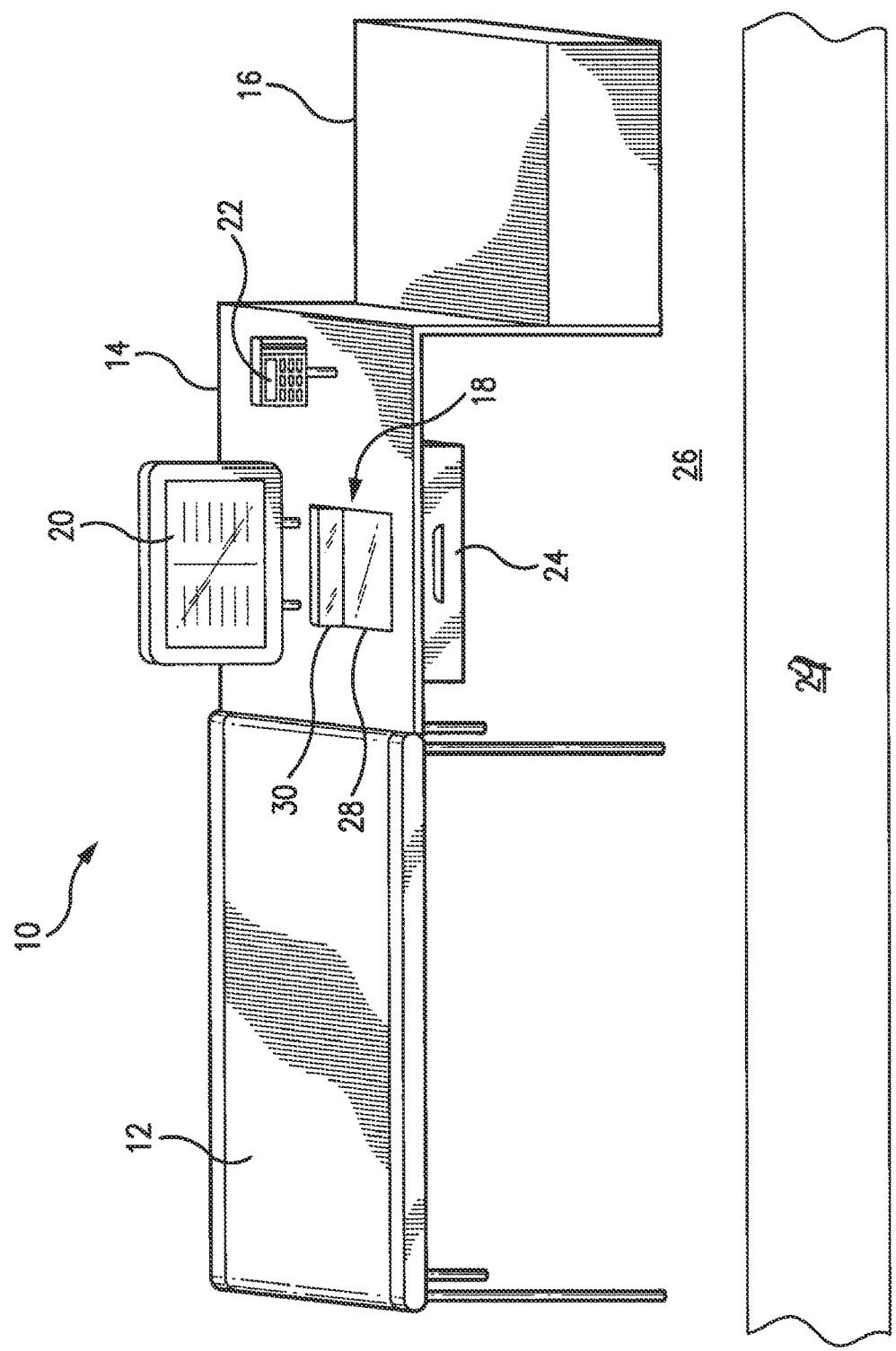
FIG. 1 illustrates a cashier-assisted checkout station.

Certain aspects of cashier-assisted checkouts are distinguishable from those of self-checkouts. First, checkout stations for cashier-assisted checkouts are constructed differently from checkout stations for self-checkouts. FIG. 1 illustrates a cashier-assisted checkout station 10 that may include a conveyor belt 12, a pay station 14, and a bagging station 16. The pay station may further include a barcode scanner such as an optic scanner 18, a display screen 20, a credit/debit card reader/signature pad 22, and a retractable/removable cashier drawer 24 in which the cashier may store received cash, checks, and coupons. The cashier-assisted checkout station 10 may be configured with an optional recess 26 where the cashier may stand without interfering with traffic in the lane 29 behind the cashier. Since the cashier is responsible for scanning the merchandise, the optic scanner 18 and the display screen 20 of the cashier-assisted checkout stations 10 are fixedly oriented towards the cashier. For example, the optic scanner 18 may be a bi-optic scanner that may include a horizontal scanner 28 and a vertical scanner 30 which together form a scanning space facing the cashier. Further, the displayer screen 20 may be a touch screen also facing the cashier.

Figure 2:
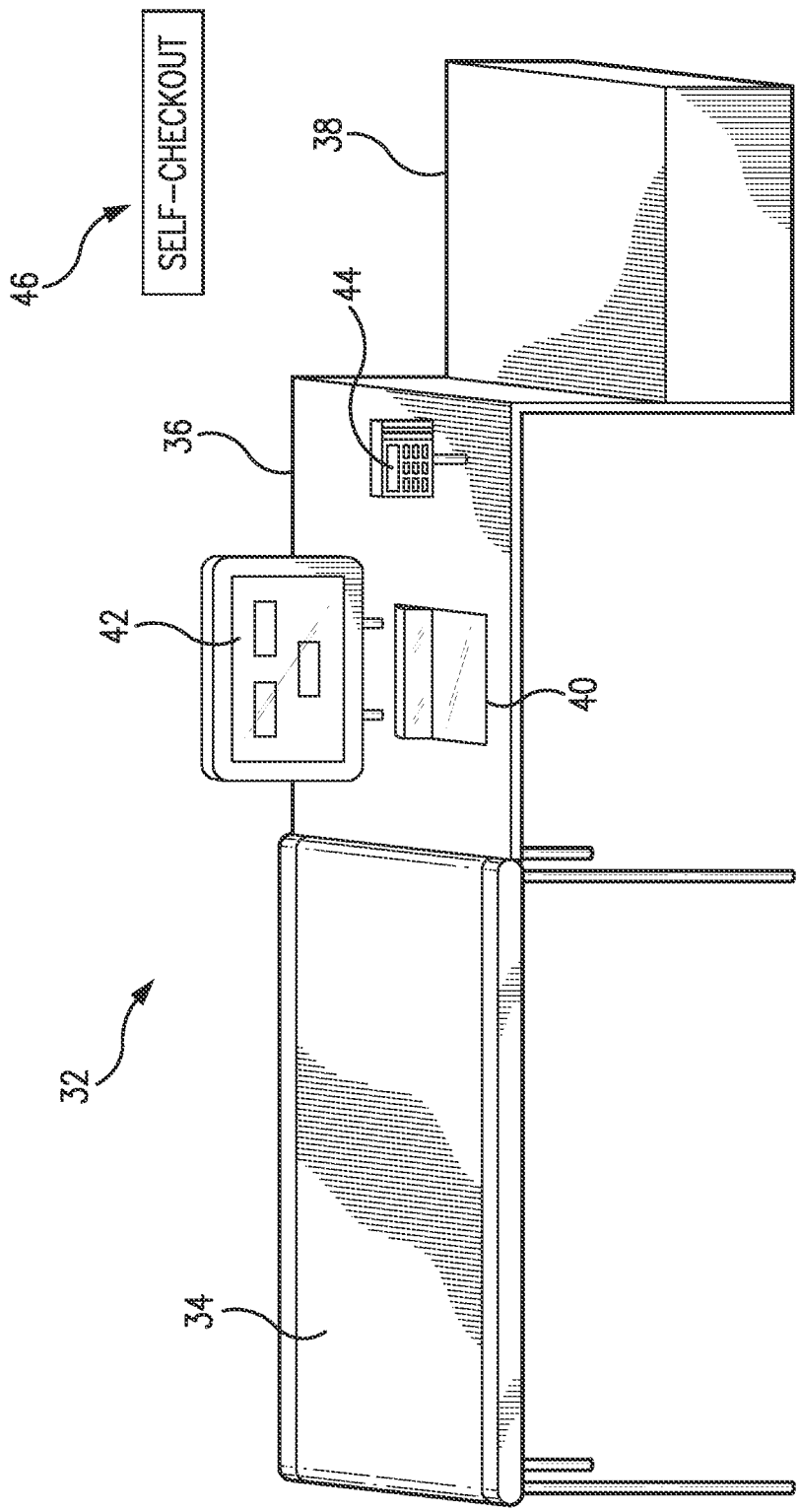
FIG. 2 illustrates a self-checkout station.

In contrast, FIG. 2 illustrates a self-checkout station 32 that may similarly include a conveyor belt 34, a pay station 36, and a bagging station 38. The pay station 32 of the self-checkout station may include a barcode scanner such as an optic scanner 40, a display screen 42, and a credit/debit card reader/signature pad 44. However, unlike the cashier-assisted checkout station 10, the self-checkout station 32 does not include a retractable/removable cashier drawer or a recess where the cashier stands. Further, since only customers are primarily responsible for scanning the merchandise at self-checkout stations, the optic scanner 40 and display screen 42 are oriented fixedly toward one direction, i.e., the customer side of the self-checkout station 32. Finally, the self-checkout station 32 may include a signage 46 that indicates a particular checkout station is designated as "SELF-CHECKOUT." In practice, the signature may be an electronic sign that can be turned on and off to indicate whether the self-checkout station is in operation.

In addition to the differences in the physical construction of cashier-assisted checkout stations and self-checkout stations, the cashier-assisted checkout stations and self-checkout stations are commonly configured to run different point-of-sale (POS) applications designed specifically for cashier or customer to use. The POS system for cashiers may be designed for efficiency or expedited transactions because it may be assumed that cashiers are usually experienced in operating the POS system. In contrast, the POS system for self-checkout customers may be designed for intuitive use with plenty of prompts and helpful hints because it may be assumed that customers usually have less experience in operating the POS system. Further, the POS system for cashier may empower the cashier with certain authorities such as keying in the price of an item or overwriting a barcode scan. In contrast, the POS system for self-checkouts may be rigid and restrictive so that the self-checkout customer may not conduct unauthorized transactions. The self-checkout customer is required to contact a customer service representative for any specially handled transactions.

Thus, currently, the cashier-assisted checkout stations are designed and manufactured differently from self-checkout stations. Cashier-assisted checkout stations have different specifications and include different components than self-checkout stations. The different physical constructions between cashier-assisted checkout stations and self-checkout stations increase the ownership cost. First, stores may receive less volume discount for purchasing different models of checkout stations. Second, it may cost more to maintain different types of checkout stations than a single type of checkout station. In addition to cost issue, cashier-assisted stations and self-checkout stations usually occupy valuable spaces in retail stores. While self-checkout stations may usually open all the time, the cashier-assisted checkout stations may be idle from time to time depending on the availability of cashiers. The idle checkout stations occupy valuable retail spaces, but do not help reduce congestions at checkout lines. Additionally, it is desirable to direct customer traffic in the same lane for either cashier-assisted checkout or self-checkout scenarios without physically rotating the checkout station as a whole.

U.S. patent application Ser. No. 13/331,541 (the '541 application, which is incorporated by reference in its entirety), which is assigned to the same owner as the present application, disclosed a checkout station that includes a turntable. The turntable includes a scanner, a scale, and a display that may be turned between a first position for the cashier-assisted checkout mode and a second position for the self-checkout mode. Since the scale as described in the '541 application is part of the turntable that turns, the scale needs to be calibrated each time the turntable turns. The calibration of the scale may incur additional costs and delay the switch between the cashier-assisted mode and the self-checkout mode.

Thus, there is a need for checkout stations that may be easily converted between a cashier-assisted checkout mode and a self-checkout mode without the need for calibrating the scale after each conversion.

Embodiments of the present invention may include a checkout station that may include means for converting between a cashier-checkout mode and a self-checkout mode without the need for calibrating the scale after each conversion.

Embodiments of the present invention may include a checkout station that may be converted between a cashier-assisted checkout mode and a self-checkout mode by re-orienting the facing direction of a display screen. Thus, the checkout station may act as a cashier-assisted checkout station in a first orientation of the display screen and/or the barcode scanner, and act as a self-checkout station in a second orientation of the display screen.

Embodiments of the present invention may include a checkout station that may include a scale fixedly attached to a framework of the checkout station and a track, surrounding the scale, through which a display moves between a first position and a second position.

Embodiments of the present invention may include a checkout station that may include a scale whose outside boundary is elliptical and a track, surrounding the scale, through which a display moves between a first position and a second position.

Embodiments of the present invention may include a scale fixedly attached to a framework of the checkout station and a means for transporting the display from a first position for cashier-assisted checkout to a second position for self-checkout.

Embodiments of the present invention may include a method of operating a checkout station in which the checkout system includes a display movable along a track and a processor that is configured to execute a point-of-sale (POS) application. The method may include in response to moving the display to a first position, executing, by the processor, the POS application in a cashier-assisted checkout mode, and in response to moving the display to a second position, executing, by the processor, the POS application in a self-checkout mode.

Embodiments of the present invention may include a method for customers to check out from a checkout station. The method may include providing a checkout station that includes a track through which a display moves between a first position corresponding to a cashier-assistant checkout mode and a second position corresponding to a self-checkout mode, in response to the cashier-assistant checkout mode, moving the display to the first position, and in response to the self-checkout mode, moving the display to the second position, in which the customers check out from a same side of the checkout station during both the cashier-assistant checkout mode and the self-checkout mode.

Figure 3A:
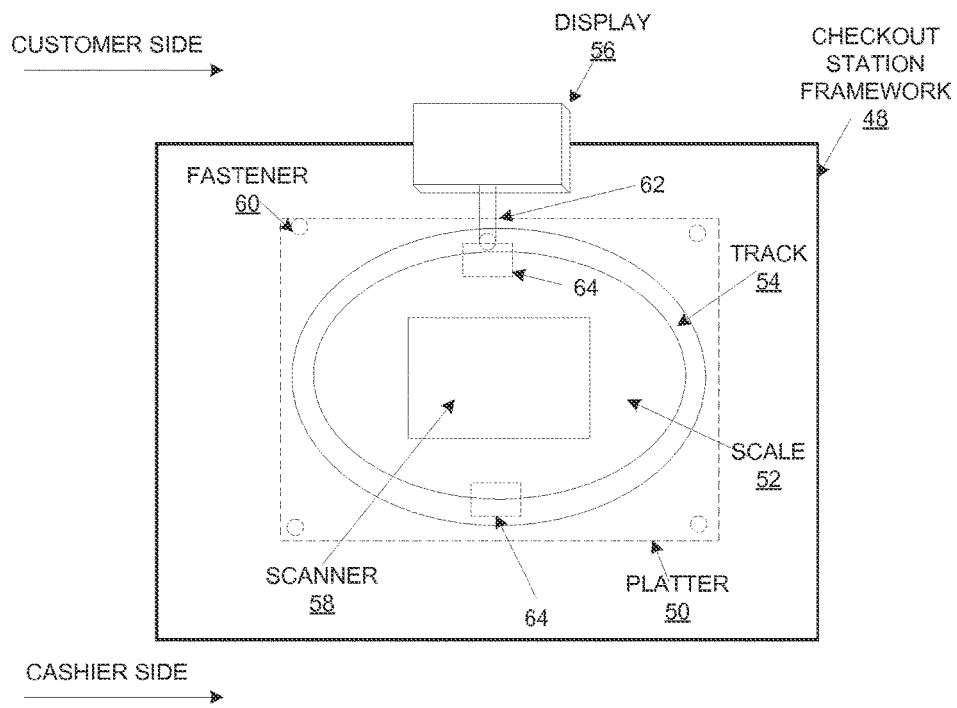
FIGS. 3A and 3B illustrate a checkout station according to an embodiment of the present invention.
Figure 3B:
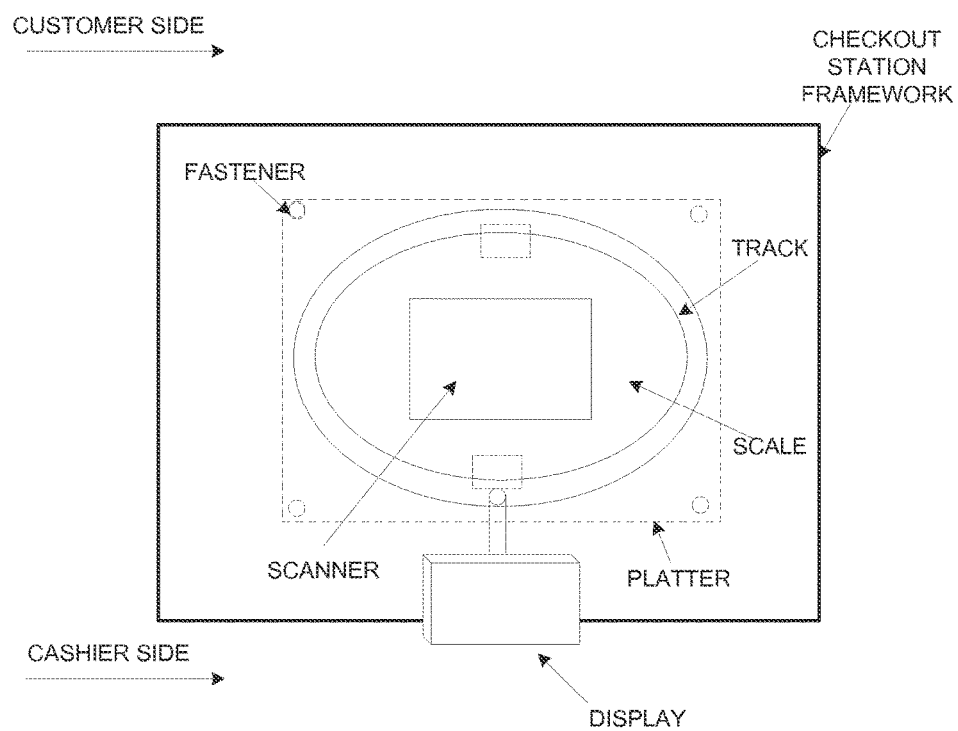

FIGS. 3A and 3B illustrate a top view of checkout station according to an embodiment of the present invention, in which FIG. 3A reflects the first cashier-assisted checkout mode of the checkout station, and FIG. 3B reflects the second self-checkout mode of the checkout station. For clarity, FIGS. 3A and 3B focus on the pay station of a checkout station and omit the conveyor belt and bagging station.

Referring to FIG. 3A, in one embodiment, a checkout station may include a base framework 48 that may support the checkout station on a ground. The checkout station may further include a platter 50, a scale 52, a track 54, a display 56, and a barcode scanner 58. The platter 50 may be fastened to the framework 48. The platter 50 may be made from man-made materials, metal, wood, or any suitable materials and may include a top plane surface facing up. In the embodiment as shown in FIG. 3A, the platter 50 may be fastened to the framework 48 via fasteners 60 at four corners of platter 50. However, in practice, platter 50 may be fixedly attached to framework 48 in any suitable way. Scale 52 may be fixedly attached to the framework 48. In one embodiment, scale 52 is fixed attached to platter 50 which, in turn, is fixedly attached to framework 48. Scale 52 may be surrounded by a track 54 which may include a trench. In an embodiment, track 54 may be an elliptical loop that surrounds an elliptically-shaped scale 52. The elliptically-shaped scale 52 that matches track 52 does not have dead spots between the scale and the track, thereby having the advantage of more accurate measurement of weights over a scale whose shape does not match the track. In an embodiment, track 52 may be circular and scale 50 is also circular, matching the shape of the track.

Display 56 may be a touch screen that may display a list of transacted items and their prices. Additionally, display 56 may display actionable elements through which a user may make selections during a transaction. For example, display 56 may show buttons indicating cash, credit card, debit card, or gift card so that the user may select a particular method for payment. Display 56 may further include a support 62 through which display 56 is coupled to track 54 which may include mechanism that allows the display 56 to move along track 54. In one embodiment, display 56 may be moved to a first position, as shown in FIG. 3A, so that the screen of display 56 is substantially facing the cashier side. At the first position, the checkout station operates in a first mode of cashier-assisted checkout. In another embodiment, display 56 may be moved to a second position, as shown in FIG. 3B, so that the screen of display 56 may is substantially facing the customer side. At the second position, the checkout station operates in a second mode of self-checkout. The checkout station may include a lock mechanism such as a latch 64 to lock the first and second positions. Additionally, the lock mechanism 64 may lock the display 56 to a suitable position other than the first and second positions. In this way, the checkout station may be switched between a cashier-assisted checkout mode and a self-checkout mode without disturbing scale 52, thus eliminating the necessity for recalibrating the scale after each mode switches.

The checkout station may further include a barcode scanner 58 that may be located underneath the top surface of scale 52. Scanner 58 may shine laser beams through a glass window upwards to capture barcodes. Therefore, when display 56 is at the first position, a cashier may scan barcodes of merchandise and face display 56, and when display 56 is at the second position, a customer may scan barcodes of merchandise and face display 56.

Figure 4:
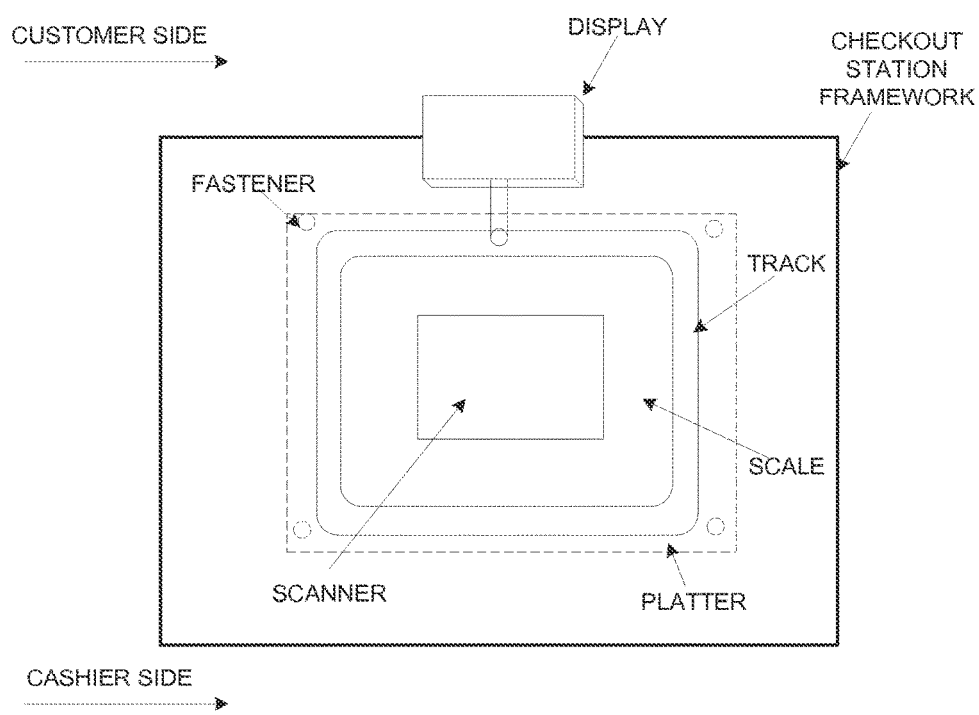
FIG. 4 illustrates a checkout station according to another embodiment of the present invention.

Track 54 may take on other shapes while scale 52 is fixed to the framework. In one embodiment as shown in FIG. 4, track 54 may be a rectangular loop with round corners. Scale 52 may be a rectangle shape that matches the inner contour of track 54. Along track 54, display 56 may be moved between a first position for cashier-assisted checkout and a second position for self-checkout. While track 54 as shown in FIGS. 3A-3B and 4 are a full loop, track 54 is not limited to a full loop. In alternative embodiments, track 54 may be a portion of an ellipse, a portion of a circle, or a portion of a rectangle. For example, track 54 may be a half ellipse, a half circle, or a half rectangle. A track of less than a full loop may cost less than a full-loop track and may leave more areas for scale 52 and barcode scanner 58.

In one embodiment, platter 50 may include latches 64 for locking display 56 to the first or the second position. A release that is accessible to a user may control, through control cables (not shown) to the latches 64, the lock and release of the latches 64 so that display 56 may be locked to the first or the second position, or released for turning between the first and second positions. The release may be placed at a position that is easily accessible by an operator. For example, the release may be located on a side surface of framework 48. Within framework 48, platter 50 may be supported by a support (not shown). The display 56 and the barcode scanner 58 may also be wired through wires underneath the top surface of and within the framework 48. These wires are placed in such a way that when the display 56 rotates back and forth, wires do not tangle.

Additionally, the checkout station may include other components. For example, the checkout station may include a credit/debit card reader that may be fixedly and detachably attached to the display screen 56 so that the credit/debit card reader 66 rotates with the display screen 56. The checkout station may also include an optional handheld barcode scanner which may be fixedly and detachably attached to the display screen 56 so that the handheld barcode scanner may be rotated along with the display screen 56. In an alternative embodiment, the handheld barcode scanner may be placed on the top surface of the base platform so that the handheld barcode scanner does not rotate with display 56. Additionally, the checkout station may include an electronic signage that may indicate whether the checkout station is operating under the cashier-assisted mode or self-checkout mode.

The checkout station may further include a trigger for toggling between the first and second modes. In one embodiment, the checkout station may include a physical switch that may switch the checkout station to the cashier-assisted mode or the self-checkout mode. In another embodiment, the trigger (not shown) may be automatically set by the latches 64 so that when display 56 is locked in a first position, the trigger may cause the checkout station to run in the cashier-assisted mode, and when the display 56 is locked in a second position, the trigger may cause the checkout station to run in the self-checkout mode.

Figure 5:
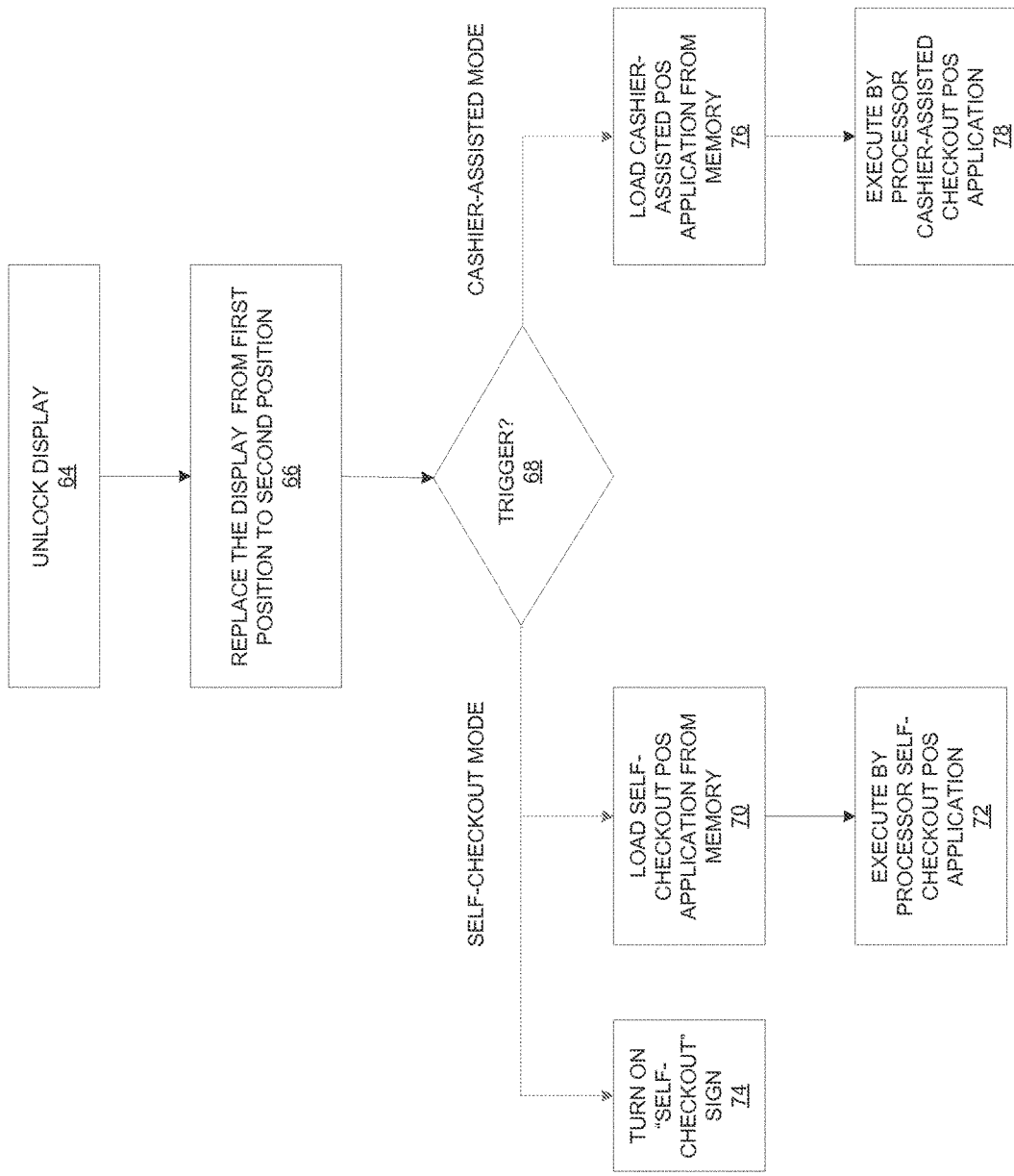
FIG. 5 illustrates a process to use the checkout station according to an embodiment of the present invention.

FIG. 5 illustrates a process to use the checkout station according to an exemplary embodiment of the present invention. At 64, the display of the checkout station may be unlocked by an operator. At 66, the display may be rotated from a first position to a second position so that the orientation of the display screen may be changed from a first direction to a second direction. For example, the display may be rotated from a first mode for cashier use to a second mode for self-checkout, or vice versa. At 68, a trigger may be engaged. A processor may be configured to determine whether the trigger indicates the start of a self-checkout mode or a cashier-assisted mode of operation. If the operation is for the self-checkout mode, at 70, the processor may be configured to load a self-checkout POS application from memory. At 72, the processor may be configured to execute the self-checkout POS application. The execution of the self-checkout POS application may include a graphic user interface (GUI) designed for a customer on a display screen. At 74, the processor may also send out a signal to turn on an electronic signage to indicate that the checkout station is for self-checkout. On the other hand, if the operation is for cashier-assisted checkout, at 76, the processor may be configured to load a cashier-assisted POS application from memory. At 78, the processor may be configured to execute the cashier-assisted POS application. The execution of the cashier-assisted POS application may include a graphic user interface (GUI) designed for a cashier on a display screen.

Figure 6:
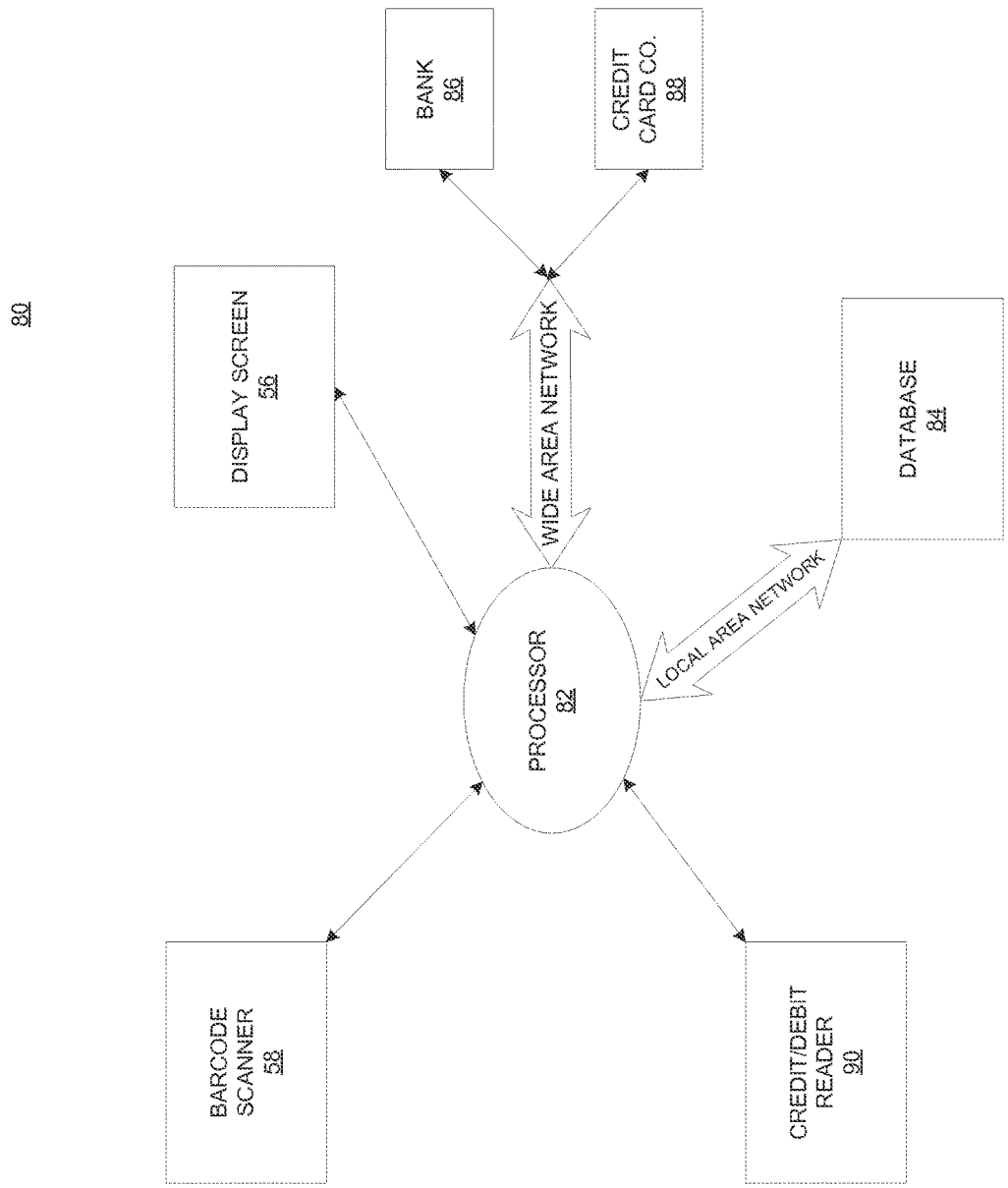
FIG. 6 illustrates a system for a checkout station according to an embodiment of the present invention.

FIG. 6 illustrates a system for a checkout station according to an exemplary embodiment of the present invention. As shown in FIG. 6, a POS system 80 may include a processor 82 that is communicatively connected to a barcode scanner 54 (including a single optic scanner, a bi-optic scanner, imager, and/or a handheld scanner), display screen 56, and credit/debit card reader 90. Further, the processor 82 may be connected to a database 84 via a local area network (LAN), where data relating to inventory may be stored. Additionally, processor 82 may have access to a wide area network (WAN) through which the processor 82 may be connected to banks 86 and credit card issuers so that a customer may receive onsite approval of the transaction.

In the event of a customer checkout, the customer may bring the merchandise that he intends to purchase to a checkout station. Each merchandise may have already been associated with a barcode. For example, the barcode may be printed on a label that is attached to the merchandise. Additionally, the customer may have store-issued membership card (for member-only club stores) or discount card which may also include barcode identifications to associate the customer to a customer account. Finally, the customer may have coupons that may also include barcodes to apply discounts to the sale transaction. The cashier (in cashier-assisted mode) or the customer (in the self-checkout mode) may start the transaction by scanning the membership card or the discount card to establish the customer's identification and associate the same with an existing account stored in database 44. Subsequently, the cashier/customer may scan each merchandise to be purchased by the customer. Since the barcode scanner 54 is oriented toward the operator, a barcode may be captured conveniently. The captured barcode may be transmitted to the processor 82 which may be configured to record the merchandise corresponding to the barcode in a list as an item to be checked out. After the cashier/customer scans all of the items of the customer, the cashier/customer may scan customer's coupons for further discounts towards the final purchase price. After counting for all items and discounts for a final purchase price, the customer may pay for the purchase with cash or cash equivalents such as a debit/credit card through the debit/credit reader 66. The POS system 80 may complete the transaction by issuing a receipt to the customer and accounting the checked-out merchandise in the inventory database.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, and specification.

What is claimed is:

1. A checkout station, comprising:
 a scale fixedly attached to a framework of the checkout station; and
 a track, at least partially surrounding the scale, through which a display moves between a first position and a second position,
 wherein when the display is moved between the first and second positions, the scale does not need to recalibrate.

2. The checkout station of claim 1, further comprising a barcode scanner for scanning barcodes.

3. The checkout station of claim 1, wherein an outside boundary of the scale is elliptical, and the track is at least a portion of an elliptical track.

4. The checkout station of claim 1, wherein an outside boundary of the scale is circular, and the track is at least a portion of a circular track.

5. The checkout station of claim 1, wherein an outside boundary of the scale is rectangular having round corners, and the track is at least a portion of a rectangle having round corners.

6. The checkout station of claim 1, wherein the scale and the track are on a single-plane platter that is fixedly attached to the framework.

7. The checkout station of claim 6, wherein the scale is bolted to the single-plane platter.

8. The checkout station of claim 1, wherein the display faces a cashier at the first position for cashier-assisted checkout and faces customers at the second position for self-checkout.

9. The checkout station of claim 8, wherein the customers are on a same side of the checkout station for either the cashier-assisted checkout or the self-checkout.

10. The checkout station of claim 1, wherein the scale is bolted to the framework from a bottom.

11. The checkout station of claim 1, wherein the display is connected to the track through a support.

12. The checkout station of claim 1, wherein the track is configured such that the display moves about at least a portion of the scale between the first position and the second position while the scale remains stationary.

13. The checkout station of claim 1, wherein the scale is fixedly attached to the framework such that an orientation of the scale does not change as the display is moved about the track between the first position and the second position.

14. The checkout station of claim 1, wherein the checkout station switchably operates in the cashier-assisted checkout mode and in a self-checkout mode, wherein the first position of the display corresponds to the cashier-assisted checkout mode and wherein the second position of the display corresponds to the self-checkout mode, wherein during the transition between the cashier-assisted mode and the self-checkout mode as the display is moved about the track, the scale remains stationary.

15. The checkout station of claim 1, wherein when the display is in the first position, the display is oriented to be viewable and used by one of the cashier and the customer during a checkout process, and wherein when the display is in the second position, the display is oriented to be viewable and used by the other of the cashier and the customer during the checkout process.

16. A checkout station, comprising:
 a scale whose outside boundary is elliptical; and
 a track, at least partially surrounding the scale, through which a display moves between a first position and a second position,
 wherein when the display is moved between the first and second positions, the scale does not need to recalibrate.

17. The checkout station of claim 16, wherein the outside boundary of the scale is circular, and the track is at least a portion circular.

18. The checkout station of claim 16, further comprising:
 a framework, wherein the scale is fixedly attached to the framework.

19. The checkout station of claim 16, further comprising a barcode scanner for scanning barcodes.

20. The checkout station of claim 16, wherein the scale and the track are on a single-plane platter that is fixedly attached to the framework.

21. The checkout station of claim 16, wherein the display faces a cashier at the first position for cashier-assisted checkout and faces customers at the second position for self-checkout.

22. A method of operating a checkout system, wherein the checkout system includes a display movable along a track at least partially surrounding a scale and a processor that is configured to execute a point-of-sale (POS) application, the method comprising:
 in response to moving the display to a first position using the track, executing, by the processor, the POS application in a cashier-assisted checkout mode; and
 in response to moving the display to a second position using the track, executing, by the processor, the POS application in a self-checkout mode,
 wherein when the display is moved between the first and second positions, the scale does not need to recalibrate.

23. The method of claim 22, wherein the moving of the display between the first position and the second position does not disturb the scale.

24. The method of claim 22, wherein the scale is fixedly attached to a framework of the checkout system.

25. A method for customers to check out from a checkout station, comprising:
 providing a checkout station that includes a track through which a display moves between a first position corresponding to a cashier-assisted checkout mode and a second position corresponding to a self-checkout mode;
 in response to the cashier-assisted checkout mode, moving the display to the first position; and
 in response to the self-checkout mode, moving the display to the second position,
 wherein the customers check out from a same side of the checkout station during both the cashier-assisted checkout mode and the self-checkout mode,
 wherein the checkout station further includes a scale fixedly attached to a framework of the checkout station, wherein the track at least partially surrounds the scale,
 wherein when the display is moved between the first and second positions, the scale does not need to recalibrate.

26. The method of claim 25, wherein an outside boundary of the scale is elliptical, and the track is an elliptical track.

27. The method of claim 25, wherein the display faces a cashier at the first position for cashier-assisted checkout and faces customers at the second position for self-checkout.

* * * * *